(12) United States Patent
Ostojic

(10) Patent No.: US 6,771,052 B2
(45) Date of Patent: Aug. 3, 2004

(54) PROGRAMMABLE MULTIPLE OUTPUT DC-DC ISOLATED POWER SUPPLY

(75) Inventor: Predrag Ostojic, Ottawa (CA)

(73) Assignee: Astec International Limited, Hong Kong (HK)

( * ) Notice: Subject to any disclaimer, the term of this patent is extended or adjusted under 35 U.S.C. 154(b) by 0 days.

(21) Appl. No.: 10/336,108

(22) Filed: Jan. 3, 2003

(65) Prior Publication Data

US 2004/0130302 A1 Jul. 8, 2004

(51) Int. Cl.[7] .............................................. G05F 1/563
(52) U.S. Cl. ........................ 323/266; 323/267; 323/272; 323/283
(58) Field of Search ................................ 323/266, 267, 323/272, 283, 284, 351; 363/65

(56) References Cited

U.S. PATENT DOCUMENTS

| | | | |
|---|---|---|---|
| 4,356,542 A | * 10/1982 | Bruckner et al. | ............ 363/26 |
| 5,959,442 A | 9/1999 | Hallberg et al. | ............ 323/282 |
| 6,028,397 A | 2/2000 | Blankers | ................ 315/209 R |
| 6,031,361 A | * 2/2000 | Burstein et al. | ............ 323/224 |
| 6,204,650 B1 | * 3/2001 | Shimamori | ................ 323/283 |
| 6,563,294 B2 | * 5/2003 | Duffy et al. | ................ 323/283 |
| 6,593,724 B1 | * 7/2003 | Chen | ........................ 323/283 |

OTHER PUBLICATIONS

Astec, AV45C Quarter–brick Series Technical Reference Notes, 1.5V, 1.8V, 3.3V, 5V Single Output, 48V Input, 100W DC–DC Converter (Rev01), Jun. 21, 2002, pp. 1–25.

Astec Power—Andover, Technical Reference Notes (TRN), AK45C 100W Series, 36 Vdc to 75 Vdc Inputs, 100W, Jun. 1, 2000—Apr. 5, 2001, pp. 1–17.

Astec, Technical Reference Notes, ALQ15XX48X Series (Open Frame Dual Output Quarter Brick), Sep. 23, 2002—Revision A, pp. 1–18.

Greg Zvonar, Using microcontrollers in high–density switch–mode power supplies, Dec. 26, 2002, pp. 49–51.

International Rectifier, Synchronous Buck Multiphase Optimized BGA Power Block, Aug. 7, 2002, pp. 1–10.

* cited by examiner

Primary Examiner—Jeffrey Sterrett
(74) Attorney, Agent, or Firm—Harness, Dickey & Pierce, P.L.C.

(57) ABSTRACT

A multi-output DC-DC power supply has programmable operating characteristics, such as voltage levels, turn-on and off sequences, mono-phase and multi-phase operation, voltage ramp-up and ramp-offs, tracking and protection mode thresholds and action-if-fault strategies. The power supply has a DC-DC converter having an output coupled to a plurality of buck converters. Each buck converter has an output and a control input where the voltage at the output of the buck converter is determined by a duty cycle of at least one pulse width modulated signal provided at the control input of that buck converter. A programmable device has outputs coupled to the control inputs of the buck converters. The programmable device generates the pulse width modulated signals at its outputs for controlling the buck converters to provide voltages corresponding to voltages programmed in the programmable device. The programmable device is programmable and reprogrammable to control the programmable operating characteristics of the power supply.

37 Claims, 4 Drawing Sheets

|   | RAIL | TIME DELAY | OUTPUT VOLTAGE |
|---|------|------------|----------------|
| A | V1   |            | N/A            |
| B | V2   | TIME       | 3.3 VDC        |
| C | V3   | TIME       | 2.5 VDC        |
| D | V4   | TIME       | 1.8 VDC        |
| E | V5   | TIME       | 1.2 VDC        |

|   | RAIL | TIME DELAY | OUTPUT VOLTAGE |
|---|------|------------|----------------|
| A | V1   |            | N/A            |
| B | V3   | TIME       | 1.5 VDC        |
| C | V5   | TIME       | 1.8 VDC        |
| D | V4   | TIME       | 2.5 VDC        |
| E | V2   | TIME       | 3.3 VDC        |

| VOLTAGE RAIL | CONDITIONS TO TURN-ON | OUTPUT VOLTAGE |
|---|---|---|
| V1 | NONE | N/A |
| V2 | V1 ON | 3.3 VDC |
| V3 | V1 & V2 ON | 2.5 VDC |
| V4 | V1 ON | 1.8 VDC |
| V5 | NONE | 1.2 VDC |

PROGRAMMABLE MULTIPLE OUTPUT DC-DC ISOLATED POWER SUPPLY

FIELD OF THE INVENTION

The present invention relates to power supplies, and more particularly to a programmable multiple output DC-DC isolated power supply with programmable operating characteristics.

BACKGROUND OF THE INVENTION

Today's electronic systems often require multiple voltages having varying turn-on and turn-off sequencing requirements. For example, application specific integrated circuits (ASICs) from different manufacturers often require different voltage rails and currents, and different turn-on and turn-off sequencing.

These requirements are increasingly being met by the use of DC-DC converters that are mounted on the printed circuit boards. As a result of technological improvements in component design, DC-DC converters for on-board applications are becoming smaller and more powerful. For example, 50 A, 150 W ¼ bricks are now available where a few years ago, 25A was the maximum available for the ¼ brick package size. In this regard, increasing the package size to a ½ brick or a full brick allows a commensurate increase in the power that the DC-DC converter package can provide. A "brick" when used in the context of DC-DC converters means the package size of converter. For example, the industry standard package size and footprint of a ¼ brick is 1.45"×2.28" by 0.5".

These newer, higher power DC-DC converters can often be used to supply all the power requirements for some electronic devices. However, both the newer, higher power DC-DC converters as well as the older, lower power, DC-DC converters typically are designed to have set output voltages. In designing the power supply for a circuit board, a DC-DC converter is selected whose output voltage meets a voltage requirement for the circuit board. Appropriate circuitry is then provided to convert the output voltage of the DC-DC converter to other voltage requirements needed as well as provide the other operating characteristics of the power supply for the circuit board. In many electronic devices requiring multiple voltages, the voltages must be powered up in an appropriate sequence and powered down in an appropriate sequence. Alternatively, multiple DC-DC converters, or DC-DC converters having multiple outputs, are used having the requisite voltage outputs. FIG. 1 illustrates diagrammatically the latter approach, which also requires appropriate circuitry to control the turn-on and turn-off sequences and other operating characteristics of the power supply.

Turning to FIG. 1, a prior art on-board (that is, for mounting on a printed circuit board) power supply 10 is shown. Power supply 10 illustratively provides four sources of power—a 3.3 VDC five amp power source, a 2.5 VDC twenty amp power source, a 1.8 VDC ten amp power source, and a 1.2 V ten amp power source. To do so, power supply 10 has a first DC-DC converter 12 that has a nominal output of 3.3 VDC at eight amps, a second DC-DC converter 14 that has a nominal output of 2.5 VDC at twenty-five amps, a third DC-DC converter 16 that has a nominal output of 1.8 VDC at twenty-five amps and a fourth DC-DC converter 18 that has a nominal output of 1.2 VDC at twenty-five amps. Each DC-DC converter 12, 14, 16, 18 has a power input coupled to a source of DC power that can range from 35 VDC to 75 VDC. DC-DC converters 12, 14, 16, 18 may illustratively be AV45C series DC-DC converters available from ASTEC Power of Andover, Mass. Each DC-DC converter 12, 14, 16, 18 may also be coupled to power supply logic (not shown) that controls the turn-on and turn-off sequences of the power supplied by each DC-DC converter, synchronizes them, and the like.

A problem with the above described on-board power supplies is that during the design and development of a circuit board, the power requirements may change. For example, ASICS from different manufacturers often require different voltages and different turn-on and turn-off sequences of the voltages supplied by the power supply. Consequently, if design changes are made to the circuit board, such as changing an ASIC requirement or replacing an ASIC from one manufacturer with an ASIC from another manufacturer, this may require that the power supply for the circuit board be redesigned. This may require that the layout of the power supply on the circuit board be redone with the resultant time and expense of doing so. Moreover, if this redesign requires replacement of one or more of the DC-DC converters, such as would be the case if one or more of the voltage requirements change, then the stock of the original DC-DC converters on-hand would no longer be of use for that product.

SUMMARY OF THE INVENTION

A multi-output DC-DC power supply has programmable operating characteristics that include at least one of voltage levels, mono-phase and multi-phase modes, turn-on and turn-off sequences, voltage tracking, switching frequencies and whether the switching frequencies are synchronized, and thresholds for protection modes and action-if-fault upon detection of a fault. The power supply has a DC-DC converter having an output coupled to a plurality of buck converters. Each buck converter has an output and a control input where the voltage at the output of the buck converter is determined by a duty cycle of at least one pulse width modulated signal provided at the control input of that buck converter. A programmable device has outputs coupled to the control inputs of the buck converters. The programmable device generates the pulse width modulated signals at its outputs for controlling the buck converters to provide voltages corresponding to voltages programmed in the programmable device. The programmable device is programmable to control the programmable operating characteristics.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
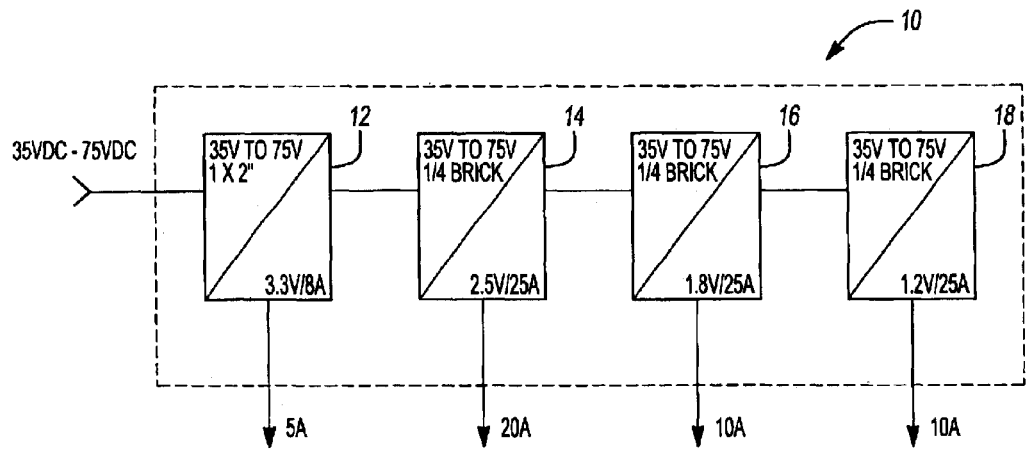
FIG. 1 is a block diagram of a prior art on-board power supply.
Figure 2:
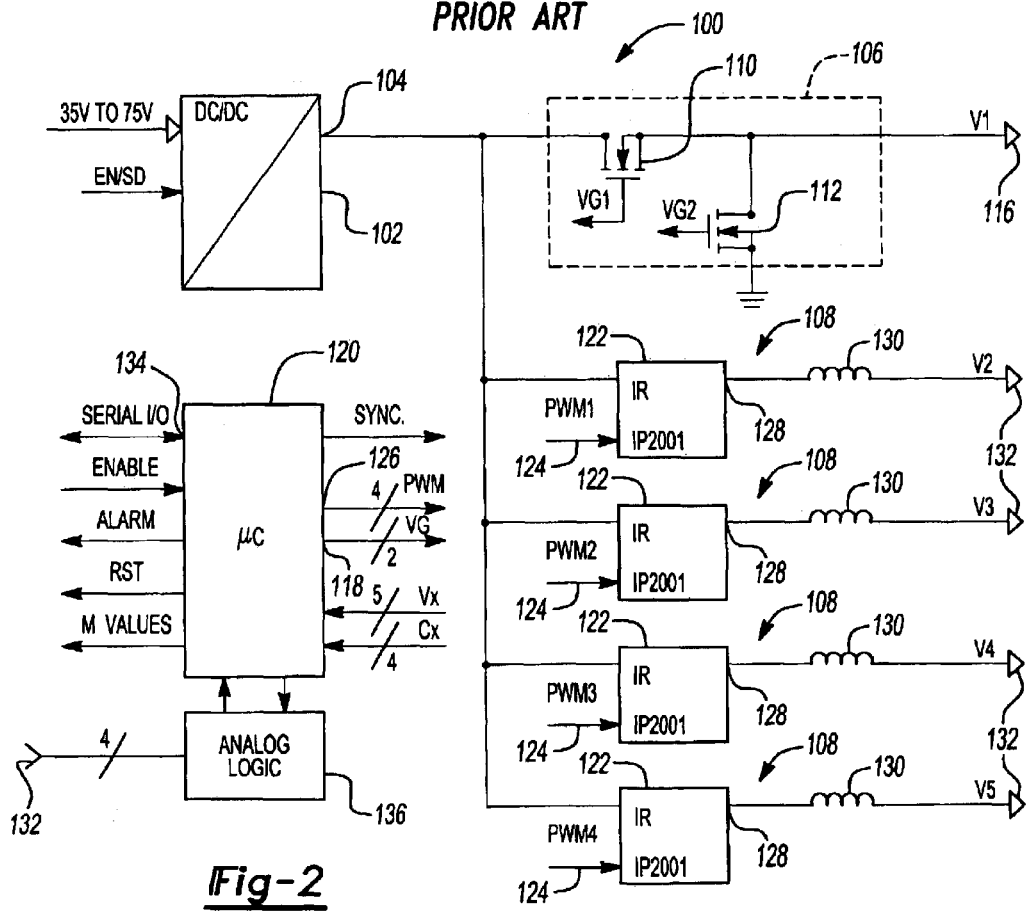
FIG. 2 is a block diagram of a power supply in accordance with the invention.
Figure 3:
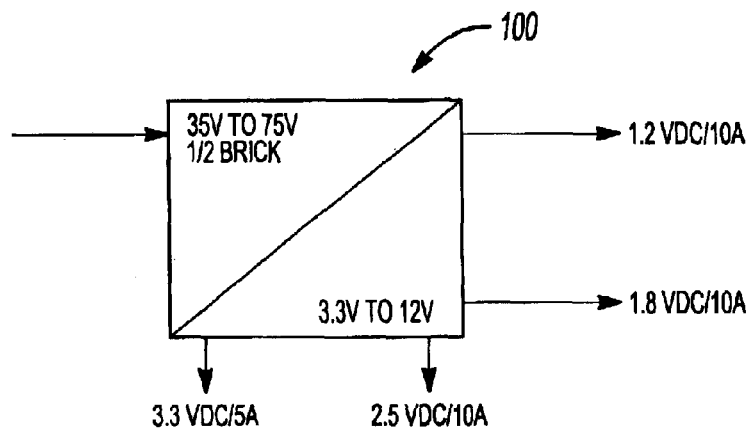
FIG. 3 is a diagrammatic view of the power supply of FIG. 2.

FIG. 2 is a block diagram of a multiple output DC-DC programmable power supply 100 having programmable operating characteristics. The programmable operating characteristics include one or more of the following: voltage levels, turn-on sequences, turn-off sequences, voltage ramp-ups, voltage ramp-offs, tracking between outputs, switching frequency and switching frequency synchronization, and protection and monitoring. FIG. 3 is a diagrammatic illustration of programmable power supply 100.

With reference to FIGS. 2 and 3, particularly FIG. 2, programmable power supply 100 has a DC-DC converter 102 having an output 104 coupled to a switch 106 and to a plurality, illustratively four, of buck converters 108. DC-DC converter 102 provides a desired output voltage, illustratively in the range of 3.3 VDC to 12 VDC. DC-DC converter 102 illustratively uses known DC-DC converter circuitry, such as that used in the regulated, high efficiency isolated DC-DC converters available from ASTEC. One such DC-DC converter series is the AV45C DC-DC converter series available with single voltage outputs of any of 1.5 VDC, 1.8 VDC, 3.3 VDC and 5 VDC. It should be understood that DC-DC converter 102 could also be an unregulated DC-DC converter.

Switch 106 switches the output of DC-DC converter to the circuit board on which power supply is used to provide voltage rail V1. Switch 106 includes two power transistors, such as MOSFETS 110, 112. The drain of MOSFET 110 is coupled to the output 104 of DC-DC converter 102 and the source of MOSFET 110 is coupled to the drain of MOSFET 112. The junction of the source of MOSFET 110 and the drain of MOSFET 112 provides output 116. The source of MOSFET 112 is coupled to ground and the gates of MOSFETs 110, 112 are coupled to outputs 118 of a microcontroller 120. MOSFET 110 switches the output of DC-DC converter 102 to the circuit board on which programmable power supply 100 is used, providing voltage rail V1 at output 116 and MOSFET 112 switches voltage rail V1 to common to discharge the capacitance of voltage rail V1 when voltage rail V1 is switched off. In this regard, when MOSFET 110 is on, MOSFET 112 is off. MOSFET 112 will be turned-on when MOSFET 110 is turned off and remain on for at least the time needed to discharge the capacitance of voltage rail V1. It should be understood that MOSFET 112 can be dispensed with if there is no need to discharge the capacitance of voltage rail V1 when it is turned off. Microcontroller 120 is programmed to provide control signals at outputs 118 that control MOSFETs 110, 112 of switch 106 to switch them on and off during turn-on and turn-off of voltage rail V1. It should be understood that if DC-DC converter 102 is an unregulated DC-DC converter, MOSFETs 110, 112 may then illustratively be controlled by microcontroller 120 to be a buck converter, with microcontroller 120 providing pulse width modulated signals at its outputs 118 to do so. An inductor (not shown) would then be coupled between the source/drain junction of MOSFETs 110, 112 and output 116.

Buck converters 108 each illustratively comprise a synchronous buck switch 122, such as an iP2001 synchronous buck switch available from International Rectifier of El Segundo, Calif. Each buck switch 122 has an input 124 coupled to one of outputs 126 of a programmable device, such as microcontroller 120. Microcontroller 120 is also programmed to provide pulse width modulated signals at outputs 126, as will be discussed in more detail later. Respective outputs 128 of buck switches 122 are coupled to one side of respective inductors 130 and the other side of the respective inductors 130 provide respective outputs 132 of the lower power buck converters 108. The outputs 132 of buck converters 108 (from top to bottom as oriented in FIG. 2) provide voltage rails V2–V5, respectively.

As is known, a buck converter is typically a down voltage converter, converting the voltage at its input to a lower voltage at its output. The output voltage of a buck converter is determined by its switching duty cycle. The longer the "on" portion of the switching duty cycle compared with the "off" portion, the higher the output voltage. The switching duty cycles of buck converters 108 are determined by the duty cycles of the pulse width modulated signals at outputs 126 of microcontroller 120. Microcontroller 120 is programmed to provide pulse width modulated signals at outputs 126 having the appropriate duty cycles to control the switching duty cycles of buck converters 108 to provide the desired voltages at the outputs 132 of buck converters 108.

Microcontroller 120 is programmable, such as through its serial I/O port 134, to change the duty cycles of the pulse width modulated signals provided at its outputs 126 thus changing the voltage outputs of the corresponding buck converters 108. Microcontroller 120 may illustratively be a CY8C26443 programmable system-on-chip microcontroller available from Cypress Microsystems of Bothell, Wash.

Figure 4:
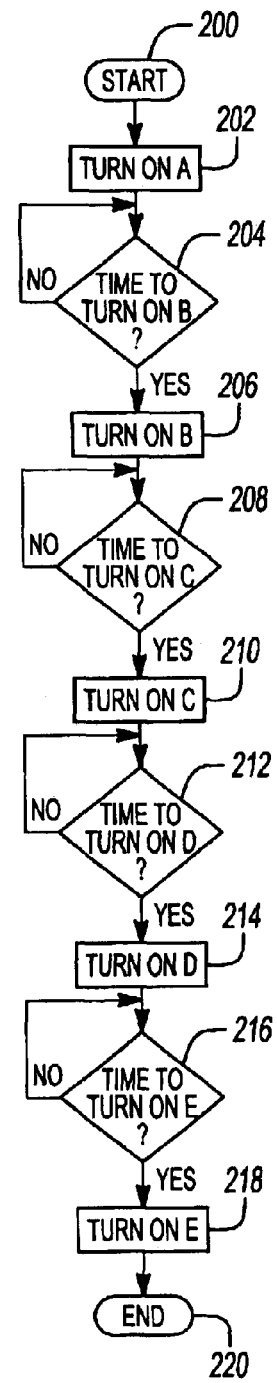
FIG. 4 is a flow chart of a turn-on sequence based on time delays for the power supply of FIG. 2.
Figures 5A, 5B, 6:
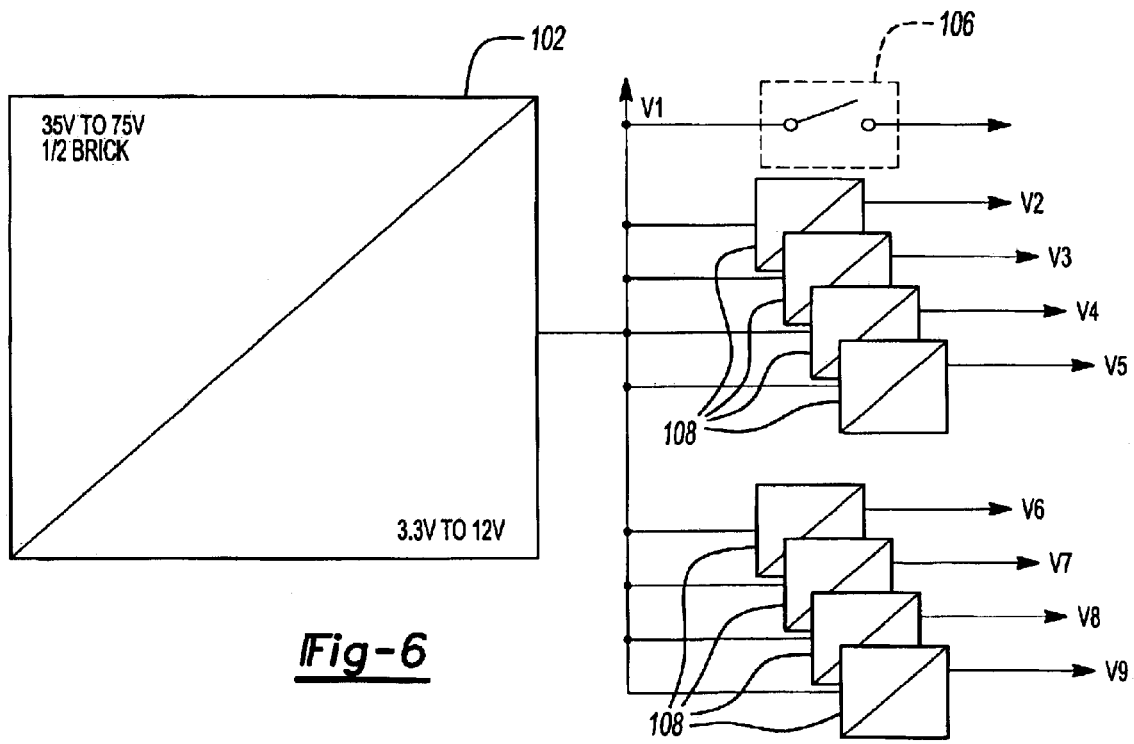
FIG. 5A is a table showing an illustrative turn-on sequence for the flow chart of FIG. 4.
FIG. 5B is a table showing an illustrative revised turn-on sequence for the flow chart of FIG. 4.
FIG. 6 is a block diagram of a variation of the power supply of FIG. 2.

Microcontroller 120 is also programmable to provide the desired turn-on and turn-off sequences of voltage rails V1–V5. FIG. 4 shows an illustrative turn-on sequence for programmable power supply 100. Assuming by way of example that the initially designed turn-on sequence and voltages are as shown in the table of FIG. 5A, the data in FIG. 5A is programmed into microcontroller 120. Referring to FIG. 4, at step 200, microcontroller 120 starts the turn-on sequence. At step 202, microcontroller 120 turns on the voltage rail corresponding to A in the table of FIG. 5A, which as shown in FIG. 5A is V1, by turning on switch 106 (that is, turning on MOSFET 110 and turning off, or keeping off, MOSFET 112) connecting the output of DC-DC converter 102 to output 116 to provide voltage rail V1. After waiting the programmed time delay at 204 for turning on the voltage rail corresponding to B in the table of FIG. 5A, microcontroller 120 turns on the voltage rail corresponding to B at 206, which as shown in FIG. 5A is V2, by starting the pulse width modulated signal at the output 126 that drives the buck converter 108 that provides V2. Microcontroller 120 generates this pulse width modulated signal to drive the buck converter 108 that provides the power for voltage rail V2 at the appropriate duty cycle so that the voltage at voltage rail V2 is at the programmed voltage (illustratively 3.3 VDC as shown in FIG. 5A). Microcontroller 120 then continues through steps 208, 210, 212, 214, 216 and 218 to turn on the voltage rails for C, D and E (which correspond to V3, V4 and V5 as shown in FIG. 5A) after waiting the programmed time delays for each. In each instance, microcontroller 120 drives the pulse width modulated signals at outputs 126 to drive the buck converters 108 that provide V3–V5 so that V3–V5 are at the voltage for them programmed into microcontroller 120 as shown in FIG. 5A.

It should be understood that microcontroller 120 can be programmed so that one or more of the power supply outputs at voltage rails V2–V5 are fixed. For example, if voltage rail V2 has a fixed output of 3.3 VDC, then microcontroller is programmed to control the buck converter 108 that provides voltage rail V2 to provide the 3.3 VDC output, but is not reprogrammable to change the output voltage of that buck converter 108.

As discussed, the turn-on sequences for the voltage rails, V1–V5 in the illustrative embodiment shown in FIG. 2 and the voltages for the voltage rails V2–V5 may change as a result of changes to the design of the circuit board on which programmable power supply 100 is used. If so, the programming for microcontroller 120 is changed so that the turn-on and turn-off sequences of the voltage rails V1–V5 and the voltages for voltage rails V2–V5 of programmable power supply 100 meet the requirements of the changed design. The table shown in FIG. 5B shows, again illustratively, the changes to the programming for microcontroller 120 to implement the changes to the turn-on sequences for the voltage rails V1–V5 and the voltages for voltage rails V2–V5 of power supply 120. The data shown in the table of FIG. 5B is programmed into microcontroller 120, replacing the data from table FIG. 5A. Microcontroller 120 executes the turn-on and voltage programming operations shown in FIG. 4, but due to the changes in the data for the voltage rails programmed into microcontroller 120, as shown in the table of FIG. 5B, the voltage rails V2–V5 are turned-on in a different sequence than as shown in the table of FIG. 5A and the voltages for the voltage rails V3–V5 are different. Voltage rail V1 is still turned on first and voltage rail V2 still has the same output voltage, although voltage rail V2 is turned on last instead of second. The voltage for voltage rail V1 remains the same, of course, as it is not programmable in the above described embodiment. The new programming for microcontroller 120 is then used to program the microcontroller 120 used for each programmable power supply 100 until a subsequent change to the design of the circuit board on which programmable power supply 100 is used dictates another change.

It should be understood that a comparable turn-off sequence may also be programmed into microcontroller 120. It should also be understood, that the turn-on sequence can be determined by microcontroller 120 monitoring the voltages of voltage rails V1–V5, and turning on each of voltage rails V1–V5 based on when other voltage rails reach their programmed output voltages. For example, if V2 cannot be turned on until V1 is fully on, then microcontroller 120 monitors V1 and doesn't start the pulse width modulated output signal that drives the buck converter 108 that provides V2 until V1 has reached its full output voltage. In this regard, microcontroller 120 is programmed as to which, if any, of the voltage rails V1–V5 must be on before others of voltage rails V1–V5 can be turned-on. During the turn-on sequence, microcontroller 120 then monitors the voltage rails V1–V5 and does not turn on a voltage rail V1–V5 until all the other of voltage rails V1–V5 that must be on first are on. In this regard, output 116 of switch 106 (voltage rail V1) and outputs 132 of buck converters 108 (voltage rails V2–V5) are coupled to input(s) of microcontroller 120 via analog logic 136 that illustratively includes an analog to digital converter with multiplexed inputs that digitizes the voltages of voltage rails V1–V5, the digitized values then being input into microcontroller 120. Alternatively, microcontroller 120 includes the analog logic and the voltage rails V1–V5 are then coupled to analog inputs of microcontroller 120. If a change in this turn-on sequence is dictated by a design change to the circuit board, the programming for microcontroller 120 is then changed accordingly.

Figures 7, 8:
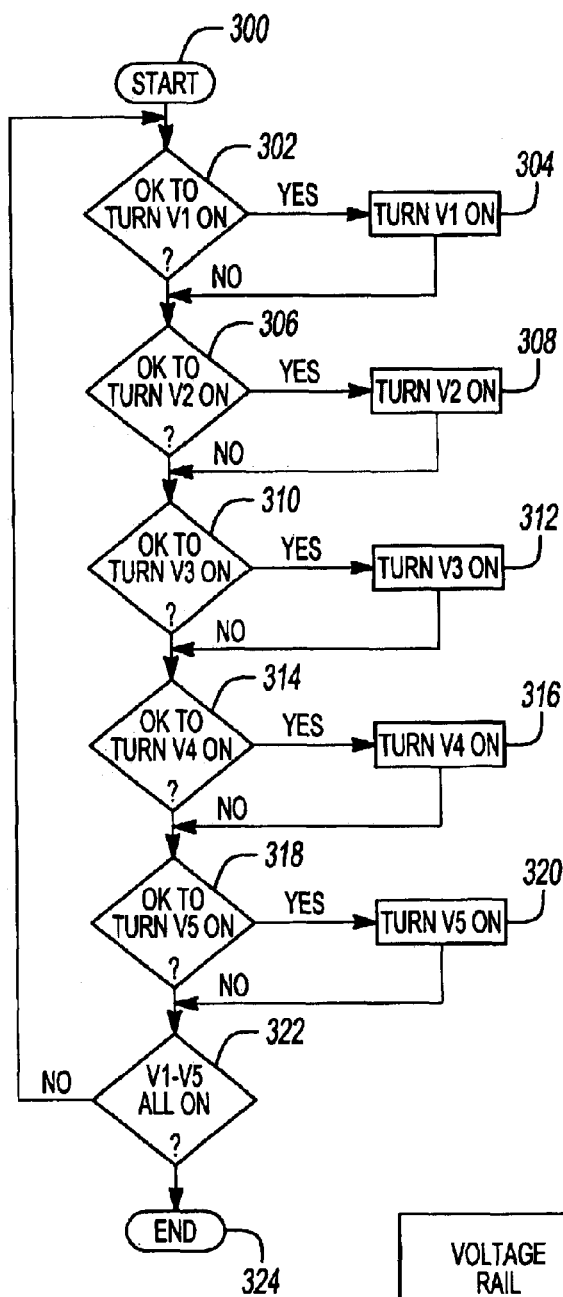
FIG. 7 is a flow chart showing an illustrative turn-on sequence based on monitored voltages for the power supply of FIG. 2.
FIG. 8 is a table showing an illustrative turn-on sequence for the flow chart of FIG. 7.

FIG. 7 is an illustrative flow-chart of a turn-on sequence for voltage rails V1–V5 where each voltage rail V1–V5 is turned on only if the other voltage rails V1–V5 that must be on (if any) before that voltage rail V1–V5 is turned on are on. Table 8 is an illustrative table showing the voltage rails V1–V5 for each voltage rail V1–V5 that must be turned on before that voltage rail V1–V5 is turned on. The data in the table of FIG. 8 is programmed into microcontroller 120.

Referring to FIG. 7, the microcontroller 120 starts the turn-on sequence at 300. It then checks at 302 to determine if the conditions, as shown in the Table of FIG. 8, are met to turn on voltage rail V1. In this case, there are no conditions so microcontroller 120 turns V1 on at 304 by turning on switch 106.

Microcontroller 120 then checks at 306 to determine if the conditions, as shown in the table of FIG. 8, are met to turn on voltage rail V2. As shown in the table of FIG. 8, V1 must be on before V2 is turned on, so microcontroller checks V1 to see if it is on and at the proper voltage level. If so, it turns on V2 at 308 and goes on to check at 310 to determine if the conditions, as shown in the table of FIG. 8, are met to turn on voltage rail V3. If not, it also goes to 310 to check whether the conditions are met to turn on the voltage rail V3. Microcontroller then proceeds through steps 312, 314, 316, 318, 320, as shown in the flow chart of FIG. 7, to check if the conditions are met, as shown in the table of FIG. 8, to turn on V3–V5 and does so if they are. At 322, microcontroller checks to see if all of V1–V5 are on, and if not, returns to the start of the turn-on sequence and again proceeds through the above steps. If so, microcontroller 120 exits from the turn-on sequence.

If the design of the circuit board on which power supply is used changes requiring changes in the turn-on sequence just described, the conditions and voltages for each of V1–V5 shown in the table of FIG. 8 are changed as needed in the programming of microcontroller 120.

In an aspect of the invention, programmable power supply 100 has programmable ramp-up and ramp-off. By programmable ramp-up, it is meant that in addition to controlling the sequence in which each voltage rail is turned-on, the ramp-up of each voltage rail provided by an output 132 of a buck converter 108, voltage rails V2–V5, are also controlled so that each voltage rail V2–V5 is brought to its rated output voltage at a programmed ramp-up. For example, microcontroller 120 may be programmed to ramp-up voltage rail V2 at a rate of 100 mv/msec until voltage rail V2 reaches its rated output voltage or programmed to ramp-up voltage rail V2 at a predetermined ramp-up curve. Similarly, microcontroller 120 can be programmed to control buck converters 108 to ramp-off voltage rails V2–V5 at programmed ramp-offs.

In another aspect of the invention, programmable power supply 100 has programmable tracking between outputs 132 in addition to programmable turn-on and turn-off sequencing and programmable ramp-up and ramp-off. By programmable tracking, it is meant that a relationship in the voltages between (among) selected voltage rails (such as the difference between the voltages of two voltage rails) is maintained or limited at programmed levels, such as those that may be imposed by the manufacturers of ASICS or other electronic devices with which programmable power supply 100 is used. To provide for programmable tracking, microcontroller 120 is programmable and reprogrammable so that it controls buck converters 108 to maintain (or limit) the difference(s) in voltage(s) between/among the selected rails at programmed levels. In this regard, microcontroller 120 may be programmed to do so based on timing or it may be programmed to monitor the ramp-up and ramp-off of the voltage rails and control the buck converters 108 based on the monitored voltages to provide the programmed tracking between the selected voltage rails.

In another aspect of the invention, microcontroller 120 is programmable and reprogrammable to configure programmable power supply 100 for mono-phase operation and multi-phase operation. Mono-phase operation is when each of buck converters 108 is operated independently of the other buck converters 108 with the outputs 132 of buck converters 108 thus providing independent output voltages, voltage rails V2–V5 thus being independent voltage rails. Multi-phase operation is when two or more buck converters 108 are operated in parallel with each other. In this case, the outputs 132 of the buck converters 108 that are operated in parallel are illustratively connected together to provide one voltage rail. This voltage rail has a maximum output power that is the sum of the power output of each of the buck converters 108 that are being operated in parallel. It should be understood that multi-phase operation is not limited to only one set of buck converters being operated in parallel. Rather, microcontroller 120 can be programmed to operate multiple sets of buck converters in parallel. It can also be reprogrammed to change which buck converters are being operated in parallel if the power requirements that programmable power supply 100 must provide change during the development of the circuit board on which programmable power supply 100 is used. With microcontroller 120 programmable and reprogrammable to change the number of voltage rails programmable power supply 100 provides and the power capacity of each, programmable power supply 100 can be a universal and custom power supply solution for a large number of different applications. The programmable mono-phase/multi-phase aspect of this invention further eliminates the use of multiple isolated and non-isolated converters in end user target applications.

Microcontroller 120 is also programmable to set the individual switching frequencies for each buck converter. As discussed above, microcontroller 120 is programmable to vary the duty cycles of the pulse width modulated signal it generates at outputs 126. It is also programmable to set the frequencies of these pulse width modulated signals. A user can thus program the switching frequencies for each buck converter 108 by so programming microcontroller 120. This also allows the switching frequencies for two or more buck converters 108 to be synchronized as well as be independent of each other.

Typically, three protection modes are provided in circuit board power supplies—under-voltage, over-voltage and over-current. The thresholds for these protection modes are preset, typically by hardwiring.

In another aspect of the invention, microcontroller 120 can be programmed to monitor the voltage rails V1–V5 to provide programmable protection modes for programmable power supply 100. As discussed above, voltage rails V1–V5 are coupled to input(s) of microcontroller 120, either through analog logic 136 or directly to analog inputs of microcontroller 120. Microcontroller 120 is programmable so that the user can program the thresholds for these protection modes and program the "action-if-fault" strategy. The "action-if-fault" strategy determines what action is taken by programmable power supply 100 if a fault occurs. These strategies are typically: latch-off (power channel providing the voltage rail, or the entire power supply, as the case may be, is shut down if a fault is detected), indefinite retry (power channel providing the voltage rail, or the entire power supply, as the case may be, will continually restart and shut down if the fault is still present), time-limited retry (power channel providing the voltage rail, or the entire power supply, as the case may be, will restart and shutdown if fault is still present for a set time period or number of cycles and if a restart was not successful by the end of the time period/number of cycles, the power channel, or the entire power supply, is latched off).

Programmable power supply 100 may illustratively also have known features of a programmable alarm, reset, and a power supply to host card interface, which may be implemented in known fashion.

With reference to FIG. 3, programmable power supply 100 having switch 106 and four buck converters 108 is illustratively packaged in a ½ brick package. FIG. 6 shows a power supply 400 constructed in accordance with the above described principles but with nine voltage rails (V1–V9). In this regard, isolated DC-DC converter 102 would be a 250 to 300 watt isolated DC-DC converter. Voltage rails V2–V9 are provided by buck converters, such as lower power buck converters 108, and voltage rail V1 is illustratively provided by the output of DC-DC converter 102 through switch 106. Power supply system module 400 would illustratively be packaged in a full brick package.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multi-output DC-DC power supply having programmable operating characteristics, comprising:
    a. at least one DC-DC converter having an output coupled to a plurality of buck converters, each buck converter having an output and a control input where the output of each buck converter is determined by a control signal at a control input of that buck converter;
    b. a programmable device having outputs coupled to the control inputs of the buck converters, the programmable device generating the control signals at its outputs to control the outputs of the buck converters; and
    c. operating characteristics of the power supply programmable and reprogrammable by programming and reprogramming the programmable device.

2. The power supply of claim 1 wherein the operating characteristics of the power supply that are programmable and reprogrammable include at least one of the following:
    a. voltages levels of the voltages output by the buck converters;
    b. at least one threshold for at least one protection mode;
    c. operation of at least two of the buck converters in one of mono-phase and multi-phase modes;
    d. a turn-on sequence of the buck converters;
    e. a turn-off sequence of the buck converters;
    f. ramp-up sequences of the voltages output by the buck converters;

g. ramp-off sequences of the voltages output by the buck converters;

h. a relationship between the voltages output by at least two of the buck converters as those voltages ramp-up;

i. a relationship between the voltages output by at least two of the buck converters as those voltages ramp-off; and j. switching frequencies of the buck converters.

3. The power supply of claim 1 wherein the operating characteristics of the power supply that are programmable and reprogrammable include voltage levels of the voltages output by the buck converters and operation of the buck converters in mono-phase and multi-phase modes.

4. The power supply of claim 3 wherein the operating characteristics of the power supply that are programmable and reprogrammable further include a turn-on sequence of the buck converters.

5. The power supply of claim 4 wherein the operating characteristics of the power supply that are programmable and reprogrammable further include a relationship between levels of the voltages output by at least two of the buck converters as those voltages ramp-up.

6. The power supply of claim 5 wherein the operating characteristics of the power supply that are programmable and reprogrammable further include switching frequencies of the buck converters and whether two or more of such switching frequencies are synchronized.

7. The power supply of claim 6 wherein the operating characteristics of the power supply that are programmable and reprogrammable further include threshold levels for protection modes that trigger fault detection and action-if-fault strategies for the protection modes upon detection of a fault.

8. A multi-output DC-DC power supply having programmable voltage outputs, comprising:

a. at least one DC-DC converter having an output coupled to a plurality of buck converters, each buck converter having an output and a control input where the voltage at the output of that buck converter is determined by a control signal at the control input of that buck converter;

b. a programmable device having outputs coupled to the control inputs of the buck converters; and c. the programmable device generating the control signals at its outputs to control the buck converters to provide voltages at their outputs corresponding to voltages programmed in the programmable device for the buck converters, the programmable device reprogrammable to alter at least one of the voltages programmed in the microcontroller for at least one of the buck converters.

9. The power supply of claim 8 wherein each control signal comprises at least one pulse width modulated signal, the voltage at the output of each buck converter determined by a duty cycle of the pulse width modulated signal that is the control signal for that buck converter.

10. The power supply of claim 9 wherein the programmable device comprises a microcontroller.

11. The power supply of claim 10 wherein the voltages programmed in the microcontroller are reprogrammable via a serial input/output port of the microcontroller.

12. The power-supply of claim 9 wherein the duty cycle of each pulse width modulated signal is programmed in the programmable device, the programmable device being reprogrammable to change the duty cycle of at least one the pulse width modulated signals.

13. The power supply of claim 12 wherein the programmable device is programmable to control a turn-on sequence of the buck converters by programming when the programmable device begins outputting the pulse width modulated control signal for each buck converter during the turn-on sequence.

14. The power supply of claim 13 wherein the microcontroller is programmable to turn on certain of the buck converters predetermined times after other of the buck converters are turned on.

15. The power supply of claim 13 wherein the programmable device is a microcontroller and the turn-on sequence is programmed in the microcontroller via a serial input/output port of the microcontroller.

16. The power supply of claim 15 wherein the microcontroller is programmable to monitor voltages at the outputs of the buck converters and turn on each buck converter during the turn-on sequence based on the monitored voltages.

17. The power supply of claim 8 wherein the programmable device is programmable to control a turn-on sequence of the buck converters.

18. The power supply of claim 13 wherein the programmable device is programmable to control at least one of the buck converters to control a ramp-up of the voltage output by that buck converter.

19. The power supply of claim 17 wherein the programmable device is programmable to control a turn-off sequence of the buck converters.

20. The power supply of claim 19 wherein the microcontroller is reprogrammable to change the turn-on and turn-off sequences.

21. The power supply of claim 8 wherein the programmable device is programmable to control the buck converters to operate in mono-phase and multi-phase modes.

22. The power supply of claim 8 wherein the programmable device is programmable to control at least two of the buck converters to control ramp-ups of the voltages output by those buck converters and programmable to provide programmable tracking between the voltages output by those buck converters as they ramp-up.

23. The power supply of claim 22 wherein the programmable device is programmable to control ramp-offs of the voltages output by the at least two buck converters as the voltages output by them ramp-off and programmable to provide programmable tracking between the voltages output by those buck-converters as they ramp-off.

24. The power supply of claim 8 wherein the programmable device is programmable to control at least two of the buck converters to control ramp-offs of the voltages output by those buck converters and programmable to provide programmable tracking between the voltages output by those buck converters as the voltages output by them ramp-off.

25. The power supply of claim 8 wherein the programmable device is programmable to set a frequency of the pulse width modulated control signal for at least one of the buck converters.

26. The power supply of claim 25 wherein the programmable device is programmable to set a frequency of the pulse width modulated control signal for each buck converter.

27. The power supply of claim 8 wherein the programmable device is programmable to set a threshold for at least one protection mode for fault detection and to set an action-if-fault in the event of fault detection.

28. The power supply of claim 27 wherein the programmable device is programmable to set thresholds for under-voltage, over-voltage and over-current protection modes for fault detection and to set an action-if-fault for each protection mode in the event of fault detection by that protection mode.

29. The power supply of claim 28 wherein the actions-if-fault include latch-off, indefinite retry and time-limited retry.

30. A multi-output DC-DC power supply having programmable voltage outputs, comprising:
   a. at least one DC-DC converter having an output coupled to a plurality of buck converters, each buck converter having an output and a control input where the voltage at the output of that buck converter is determined by a duty cycle of at least one pulse width modulated signal provided at the control input of that buck converter;
   b. a programmable device having outputs coupled to the control inputs of the buck converters;
   c. the programmable device generating the pulse width modulated signals at its outputs for controlling the buck converters to provide voltages corresponding to voltages programmed in the programmable device;
   d. the programmable device programmable to control a turn-on sequence of the buck converters;
   e. the programmable device programmable to operate at least two of the buck converters in one of mono-phase and multi-phase modes; and
   f. the programmable device reprogrammable to alter at least one of the voltages for at least one of the buck converters, to alter the turn-on sequence of the buck converters, and to change the mode of the at least two buck converters operated in one of mono-phase and multi-phase modes from one mode to the other mode.

31. The power supply of claim 30 wherein the programmable device is programmable and reprogrammable to control the duty cycle of each pulse width modulated signal.

32. The power supply of claim 31 wherein the programmable device is a microcontroller.

33. The power supply of claim 32 wherein the microcontroller is reprogrammable via a serial input/output port of the microcontroller.

34. The power supply of claim 33 wherein the microcontroller is programmable and reprogrammable to control a turn-off sequence of the buck converters.

35. The power supply of claim 32 wherein the microcontroller is programmable and reprogrammable to control at least two of the buck converters to control ramp-ups of the voltages output by those buck converters and to provide programmable tracking between the voltages output by those buck converters as the voltages output by them ramp-up.

36. The power supply of claim 35 wherein the microcontroller is programmable and reprogrammable to set frequencies of the pulse width modulated signals and whether to synchronize them.

37. The power supply of claim 36 wherein the microcontroller is programmable and reprogrammable to set thresholds for protection modes for fault detection and to set an action-if-fault for each protection mode upon fault detection by that protection mode.

* * * * *